INVENTORS
JOHN CORRIGAN,
PETER SHERRY,

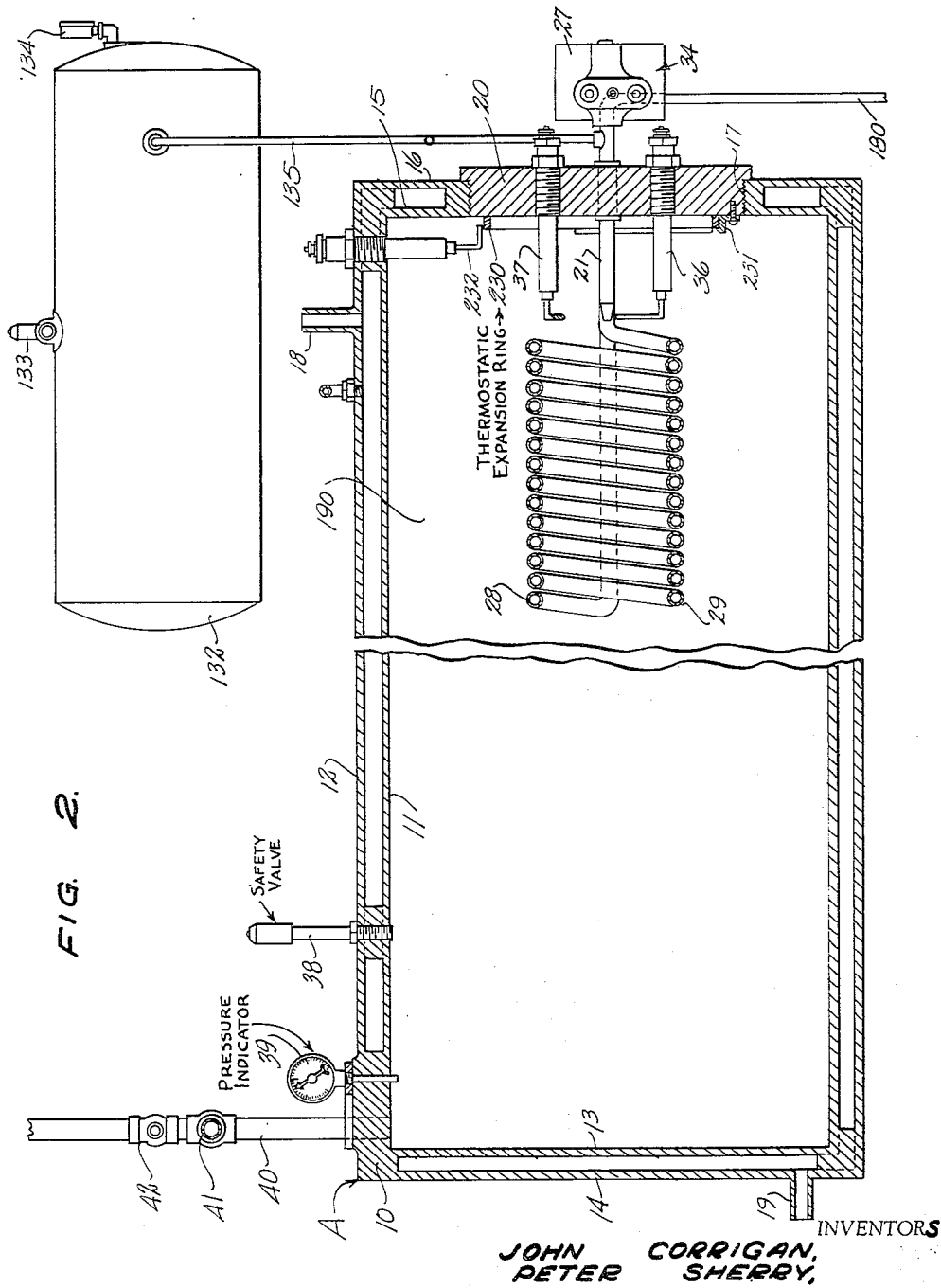

Sept. 10, 1957 P. SHERRY ET AL 2,805,547
TEMPERATURE RESPONSIVE CONTROL FOR FUEL AND WATER
VAPORIZERS IN COMBUSTION CHAMBER
Filed Feb. 1, 1952 5 Sheets-Sheet 3
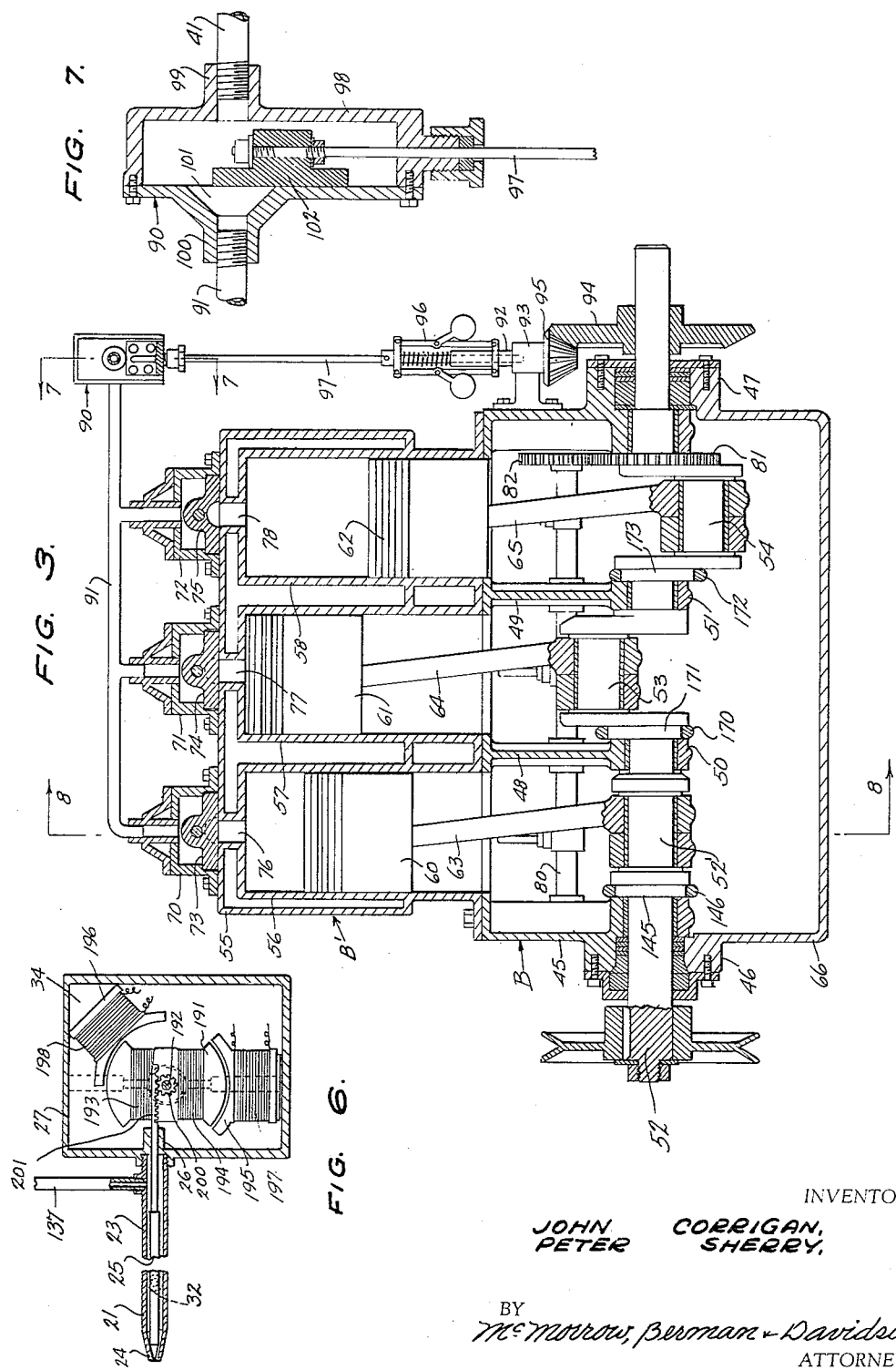
INVENTORS
JOHN CORRIGAN,
PETER SHERRY,
BY
McMorrow, Berman & Davidson
ATTORNEYS

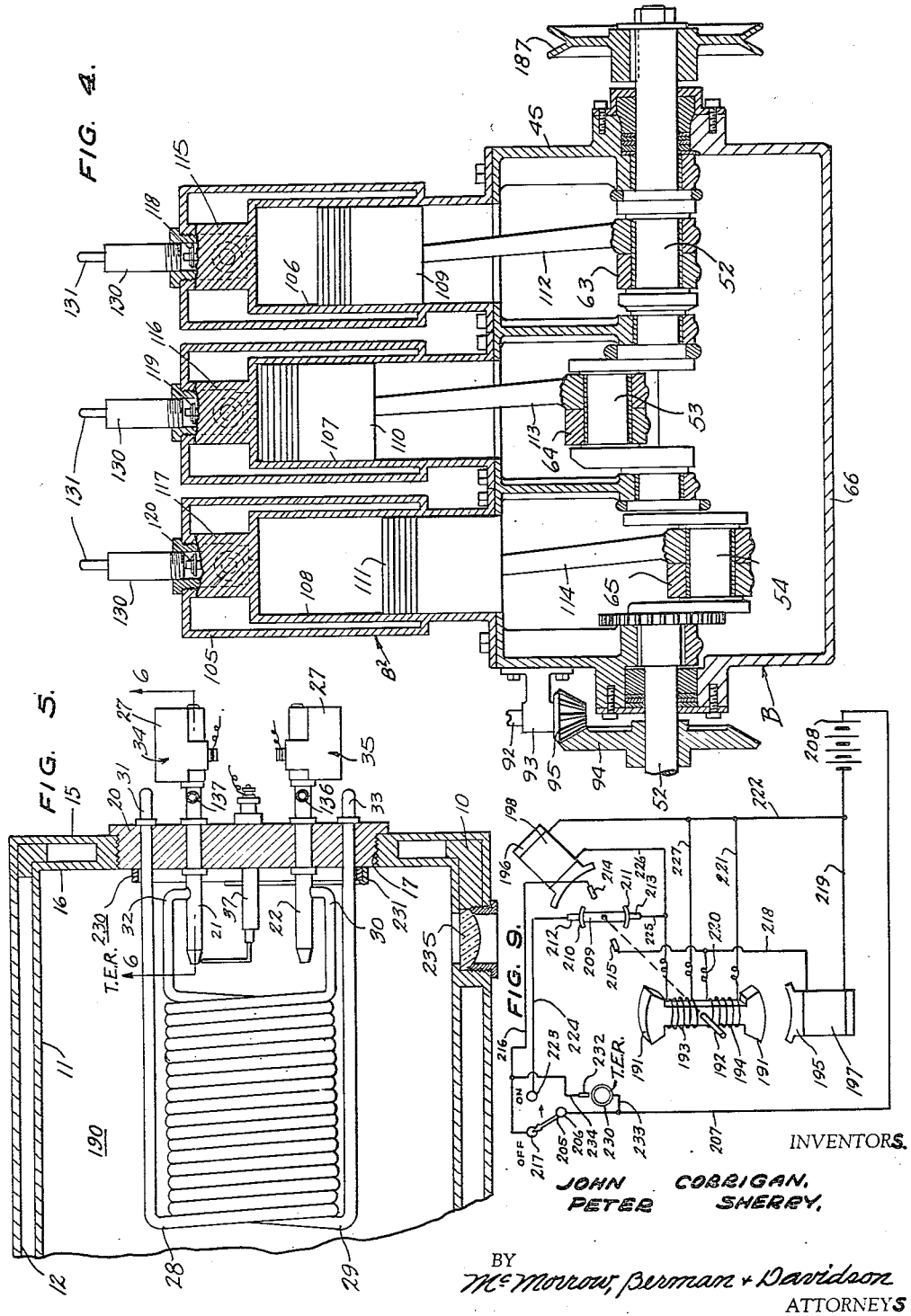

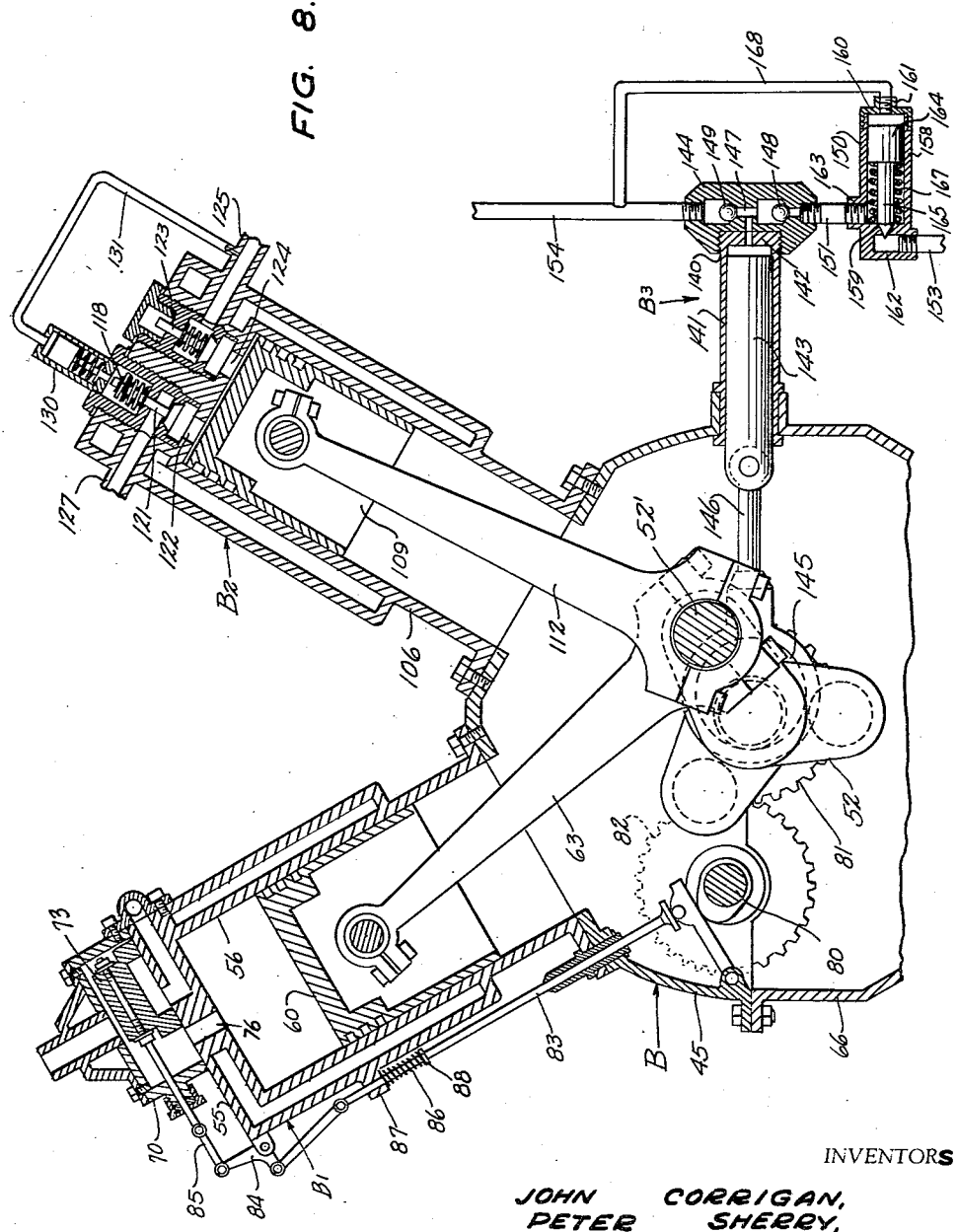

United States Patent Office 2,805,547
Patented Sept. 10, 1957

2,805,547

TEMPERATURE RESPONSIVE CONTROL FOR FUEL AND WATER VAPORIZERS IN COMBUSTION CHAMBER

Peter Sherry and John Corrigan, Walla Walla, Wash.

Application February 1, 1952, Serial No. 269,404

1 Claim. (Cl. 60—39.28)

This invention relates to power plants, and more particularly to apparatus for delivering fluid at high pressure and temperature to drive a pressure fluid-operated prime mover, such as an engine or turbine.

It is among the objects of the invention to provide a fluid pressure generator which will deliver fluid, such as a mixture of steam, air and products of fuel combustion at high pressure and temperature to drive a prime mover; which burns fuel directly in a pressure chamber so that the products of combustion and all of the combustion heat are added to the pressure fluid rather than the products of combustion and a substantial portion of the heat being vented through a stack or other exhaust passage; which utilizes steam to hydrolyze products of incomplete fuel combustion and provide a gaseous fuel which burns at a higher temperature than the primary fuel; which also utilizes steam or vapor in the pressure fluid to prevent the temperature of the pressure fluid from exceeding a value above which the apparatus would be endangered; which is automatically controlled to maintain temperatures within the limits of safety; which utilizes large quantities of compressed air in the pressure fluid mixture in proportion to the amounts of steam and fuel combustion products in such mixture; and which is simple and durable in construction, economical to manufacture, easy to operate, and efficient and effective in operation.

Other objects and advantages will become apparent from a consideration of the following description and the appended claim in conjunction with the accompanying drawings, wherein:

Figure 2 is a longitudinal cross-sectional view of the generator on the line 2—2 of Figure 1;

Figure 3 is a cross-sectional view of the engine on the line 3—3 of Figure 1;

Figure 4 is a cross-sectional view of the compressor on the line 4—4 of Figure 1;

Figure 5 is a fragmentary cross-sectional view of the generator on the line 5—5 of Figure 1;

Figure 6 is a cross-sectional view of the injection nozzle on an enlarged scale on the line 6—6 of Figure 5;

Figure 7 is a fragmentary cross-sectional view of the control valve on an enlarged scale on the line 7—7 of Figure 3;

Figure 8 is a cross-sectional view of the engine, compressor and pump, on the line 8—8 of Figure 3; and Figure 9 is a wiring diagram of the power plant control mechanism.

Figure 1:
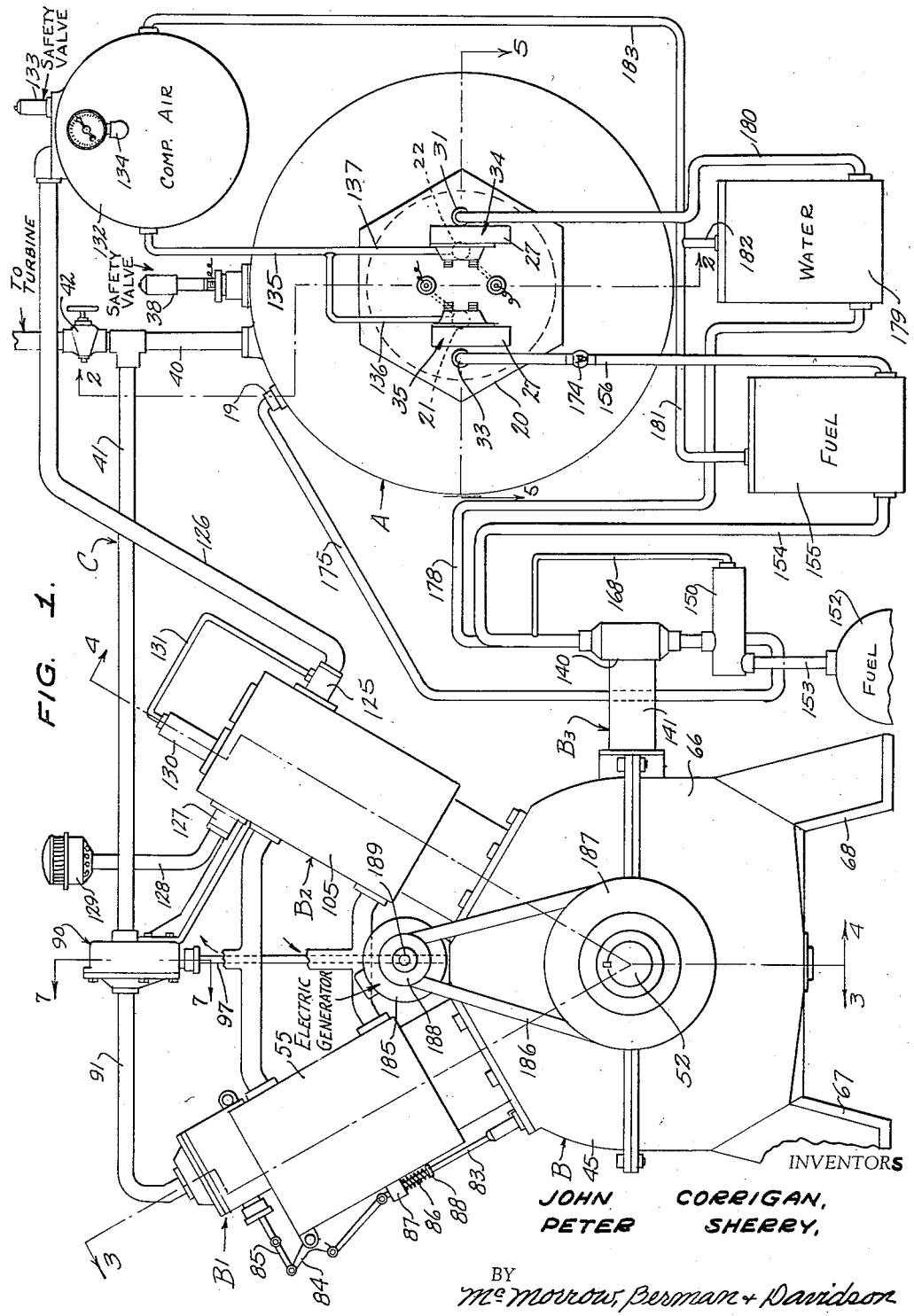
Figure 1 is a diagrammatic elevational view of a power plant illustrative of the invention.

With continued reference to the drawings, the power plant or pressure fluid-generating apparatus comprises a fluid pressure generator, generally indicated at A, a combined engine and air compressor unit, generally indicated at B and including an engine section B1, an air compressor B2 and pumps B3 for supplying fuel and water to the fluid pressure generator A, and a conduit system, generally indicated at C, interconnecting the generator A and the engine-compressor unit B.

The motive fluid generator A, as particularly illustrated in Figures 2 and 5, includes a receptacle 10 of elongated, cylindrical shape having an inner cylindrical wall 11 and outer cylindrical wall 12 circumspatially receiving the inner wall 11, a continuous inner end wall 13 at one end of the receptacle, a continuous outer end wall 14 spaced from and substantially parallel to the inner wall 13, and annular inner and outer walls 15 and 16 at the other end of the receptacle disposed in spaced apart and substantially parallel relationship and surrounding a screw-threaded opening 17 disposed substantially coaxially of the cylindrical receptacle. The receptacle walls are permanently united to provide an integral body and the spaces between the inner and outer walls of the receptacle constitute a water jacket through which cooling water flows to protect the receptacle walls against overheating.

The cooling water is admitted into the water jacket through an inlet fitting 18 which extends through and projects from the outer cylindrical wall 12 of the receptacle and is discharged from the water jacket through a fitting 19 which also extends through and projects from the outer cylindrical wall 12 of the receptacle, the water for the inlet 18 being pumped from a suitable water reservoir or supply tank by a water pump to be further referred to hereinafter.

A burner head 20 in the shape of an externally screw-threaded, circular disc defining a closure member which is threaded into the opening 17 in the corresponding end wall of the receptacle 10, and injection nozzles 21 and 22 extend through and are mounted in the head 20 in spaced apart and substantially parallel relationship to each other.

As is particularly illustrated in Figure 6, each nozzle comprises a tube 23 of elongated, cylindrical shape extending through the nozzle or burner head 20 and having its end inwardly of the receptacle tapered to provide a combined nozzle and valve seat 24 of partly conical shape. A valve stem 25 extends slidably through each burner tube and has its end adjacent the tapered end of the tube pointed to provide a needle valve formation cooperating with the valve seat 24 to open and close the corresponding burner. At the end of the tube 23 outwardly of the burner head 20, the stem 25 extends through a suitable packing gland 26 in a control unit housing 27 and is connected within the housing 27 with burner control mechanism later to be described in detail.

Vaporizing tube coils 28 and 29 are mounted in the receptacle 10 adjacent the inner ends of the nozzles 21 and 22, and the coil 28 is connected at one end into the tube of the burner 22, as indicated at 30, adjacent the inner side of the head 20 and extends at its other end through the burner head 20 and is provided at the other side of the burner head with a fitting 31. The coil 29 is connected at one end to the tube of the nozzle 21, as indicated at 32, adjacent the inner side of the head 20 and extends at its other end through the head 20 and is connected at the outer side of the head 20 to a fitting 33. Control units 34 and 35 are mounted one on each of the nozzles 21 and 22 at the ends of the nozzle tubes disposed at the outer side of the burner head 20.

Electrodes 36 and 37 are mounted in and extend through the burner head 20 adjacent the nozzles 21 and 22, respectively, each electrode comprising a tube or sleeve of insulating material mounted in and extending through the burner head, and a conductor extending through the corresponding sleeve and having an angularly disposed end portion within the receptacle 10 terminating in spark-producing relationship to the tip or nozzle of the tube of the corresponding burner. At the outer side of the head 20 the electrodes are connected to a suitable spark-generating device, such as an electric transformer coil of a type well known to the art and commonly used in the ignition systems of fuel oil burners and similar devices.

A safety valve 38 of known construction extends through and is mounted in the cylindrical wall of the receptacle 10 for relieving pressure from the interior of the receptacle at a predetermined pressure value and a pressure-indicating gauge 39 is also mounted in and extends through the cylindrical wall of the receptacle. An outlet conduit 40 of pressure fluid extends at one end through the cylindrical wall of the receptacle adjacent the inner end wall 13, and a branch conduit 41 leads from the conduit 40 to the engine B1. The conduit 40 extends beyond the branch conduit 41 to a suitable prime mover, such as a fluid pressure-operated engine or turbine, and a manually operated cut-off valve 42 is disposed in the conduit 40 at the side of the branch conduit 41 remote from the receptacle 10.

The engine and compressor unit B comprises a crankcase 45 having end walls which support end main bearings 46 and 47, and intermediate main bearing webs 48 and 49 which support intermediate main bearings 50 and 51. A crank shaft 52 is journaled in the crankcase main bearings and has three crank throws, each of which includes a double length crank pin, as indicated at 52', 53 and 54. A bank 55 of engine cylinders, as indicated at 56, 57 and 58, is mounted on the crankcase and these cylinders are preferably formed en bloc and provided with water jackets. The cylinder bank 55 extends longitudinally of the crankshaft 52 and pistons 60, 61 and 62 are reciprocably mounted in the cylinders 56, 57 and 58, respectively, and connected to the crank pins 52, 53 and 54 by connecting rods 63, 64 and 65, respectively.

An oil pan 66 is secured to the crankcase 45 in the manner commonly employed in the construction of internal combustion engines and is provided with brackets, as indicated at 67 and 68, for mounting the unit B on a suitable supporting structure.

Valve housings 70, 71 and 72 are mounted on the ends of the cylinders 56, 57 and 58 remote from the crankcase 45 and slide valves 73, 74 and 75 are mounted in the valve housings 70, 71 and 72, respectively, and control fluid passages 76, 77 and 78 leading respectively from the valve housings 70, 71 and 72 into the cylinders 56, 57 and 58.

A cam shaft 80 is journaled in the crankcase 45 spaced from and substantially parallel to the crankshaft 52, and this cam shaft is driven from the crankshaft by the timing gears 81 and 82. Cams on the cam shaft 80 operate push rods, as indicated at 83, and provided one for each cylinder, and the push rods operate rocker arms 84 pivotally mounted one on each cylinder and connected through suitable links 85 to the corresponding slide valves 73, 74 and 75. Th valves are returned in the direction opposite that in which they are moved by the cams on the cam shaft by springs, as indicated at 86, surrounding each push rod between a spring abutment, as indicated at 87, fixed on the corresponding cylinder and a movable spring abutment 88 fixed on the corresponding push rod.

The conduit 41 leads from the main conduit 40 to a control valve, generally indicated at 90, and a pressure fluid manifold 91 leads from the control valve 90 to the several valve housings 70, 71 and 72, as is particularly illustrated in Figure 3, to conduct fluid under pressure from the conduit 40 to the engine. The engine may exhaust to the atmosphere or to a suitable heat exchanger or condenser, as may be desired.

A governor shaft 92 is journaled on one end of the crankcase 45 by a bearing 93 and driven by a bevel gear 94 mounted on the crankshaft 52 and meshing with a bevel gear 95 mounted on the governor shaft. A centrifugal governor 96 is mounted on the governor shaft 92 and connected through a rod 97 with the control valve 90. This control valve includes a valve housing 98 having fittings 99 and 100 receiving the adjacent ends of the branch conduit 41 and the manifold 91. The housing is provided with a valve port 101 leading into the fitting 100 and a slide block 102 is mounted in the housing and connected to the rod 97 for controlling the port 101.

With this arrangement, the engine B1 is maintained in operation at a substantially constant speed as long as there is a sufficient supply of fluid under pressure from the fluid pressure generator A through the branch conduit 41.

A compressor unit B2 comprises a bank 105 of air compressor cylinders, preferably formed separately and provided with individual water jackets, mounted on the crankcase 45 and including cylinders 106, 107 and 108. The bank of compressor cylinders extends longitudinally of the crankcase, and pistons 109, 110 and 111 are reciprocably received in the cylinders 106, 107 and 108, respectively, and connected by connecting rods 112, 113 and 114 to the crank pins 52, 53 and 54, respectively, so that the pistons 109, 110 and 111 are reciprocated in the corresponding compressor cylinders 106, 107 and 108 when the crankshaft 52 is rotated by the engine B1.

The compressor cylinders 106, 107 and 108 are provided with valve housings 115, 116 and 117, respectively, at their ends remote from the crankcase 45 and compressor valves 118, 119 and 120 are mounted in the housings 115, 116 and 117, respectively. As is particularly illustrated in Figure 8, each of the compressor valve mechanisms includes an intake valve 121 controlling an intake passage 122 in the corresponding cylinder head, and an outlet or exhaust valve 123 controlling an outlet or exhaust passage 124 in the cylinder head. The outlet valves 123 of the three cylinders are connected through a manifold 125 to a compressed air supply conduit 126, and the inlet valves 121 are connected through a manifold 127 to one end of an intake conduit 128 which carries an air filter or cleaner 129 on its other end.

Expansible chamber devices, as indicated at 130, are mounted one over each intake valve 121 and respectively connected by tubes 131 to the outlet manifold to hold the inlet valves 121 open in the event the air pressure in the outlet manifold exceeds a predetermined value to thereby unload the compressor and avoid damage to the mechanism by excessive pressure of the compressed air.

The supply pipe 126 leads to a compressed air supply tank or reservoir 132 equipped with a safety valve 133 and a pressure-indicating gauge 134 and a heat interchanger, not illustrated, may be connected into the conduit 126 to extract some of the heat from the compressed air if this should be found necessary or desirable.

A conduit 135 leads from the air supply tank 132 and is branched, as indicated at 136 and 137, and connected to the tubes 23 of both of the burners 21 and 22 at the outer side of the burner head 20 to provide a continuous supply of compressed air to both burners, the compressed air being supplied to the burner tubes at the side of the corresponding vaporizing coil connections remote from the burner tips or nozzles.

The pump unit B3 includes a fuel pump, a water pump and a supplementary or starting fuel pump. As all of these pumps may be substantially identical in construction, the fuel pump only has been illustrated in detail in the accompanying drawings.

The fuel pump 140, as particularly illustrated in Figures 1 and 8, comprises a cylinder 141 mounted at one end in the side of the engine crankcase 45 and having its other end closed by an apertured end wall 142 and externally screw-threaded, a piston 143 reciprocable in the cylinder 141 and a valve housing 144 threaded onto the screw-threaded outer end of the cylinder. The piston 143 extends at one end into the engine crankcase, and a cam 145 is provided on the crankshaft 52 in alignment with the piston 143. A connecting rod 146 is journaled at one end on the cam 145 and connected at its other end to the inner end of the piston 143 to reciprocate the piston in the cylinder 141 when the crankshaft 52 is driven by the engine B1.

The valve housing 144 has a passage 147 extending longitudinally therethrough substantially perpendicular to the longitudinal center line of the cylinder 141 and connected to the aperture or port in the cylinder head 142. Ball check valves 148 and 149 are provided in the passage 147, the valve 148 constituting an inlet and the valve 149 an outlet valve. A pump regulator 150 is connected to the inlet end of the passage 147 by a pipe nipple 151 and is also connected to a fuel supply tank 152 by a fuel supply pipe or conduit 153. The outlet end of the valve passage 147 is connected through a conduit 154 to an auxiliary fuel tank 155 which is in turn connected through a conduit 156 to the fitting 33 of the vaporizing coil 29 which supplies vaporized fuel to the tube of the burner 21.

With this construction, fuel will be constantly supplied under pressure to the burner 21, while the pump 140 is operated, and supplied with fuel from the fuel reservoir 152.

The pump controlling mechanism 150 comprises a cylinder 158 having an end wall 159 provided with an aperture beveled to provide a valve seat and with a screw cap 160 closing its other end and provided with a tube-receiving boss 161. The supply pipe 153 from the fuel supply tank is connected into a fitting 162 disposed at the outer side of the cylinder end wall 159 and in communication with the aperture in this end wall, and the pipe nipple 151 is connected with the cylinder through a boss 163 at the other side of the end wall 159, so that the fuel must pass through the aperture in the end wall 159 in order to flow from the supply pipe 153 through the nipple 151 to the pump valve 144.

A piston 164 is mounted in the cylinder 150 and a stem 165 projects from the piston 164 and has a pointed end cooperating with the valve seat in the end wall 159 to close the aperture through this end wall. A compression spring 167 surrounds the plunger 165 between the piston 164 and the end wall 159 and resiliently urges the plunger out of closing engagement with the port in the end wall. A tube 168 is connected at one end to the boss 161 and at its other end to the pump outlet conduit 154 to apply the pressure in the outlet conduit 154 to the end of the piston 164 remote from the stem 165. If the fuel pressure in the pipe or conduit 154 reaches a value sufficient to compress the spring 167, the plunger 165 will close the aperture in the end wall 159 and cut the pump 140 off from the fuel supply tank 152.

The operation of the pump control device 150 will prevent building up dangerous pressures in the pump and in the auxiliary fuel tank 155 and the conduits connected with the latter.

The water pump is driven by a connecting rod 170 journaled at one end on a cam 171 on the crankshaft 52 and the auxiliary fuel pump is driven by a connecting rod 172 journaled at one end on a cam 173 on the engine crankshaft.

The auxiliary fuel pump is connected to the burner 21 for supplying a volatile fuel to this burner to start the pressure generator and warm up the vaporizing coils. The conduit 156 is provided with a control valve 174, to control a supply of fuel to the burner 21, the auxiliary fuel pump being cut off and the main fuel pump turned on as soon as the fluid pressure generator has reached a satisfactory operating temperature.

As stated above, water is supplied to the water jacket of the fluid pressure generator A from a suitable supply tank or reservoir, not illustrated, through the fitting 18, and water is drawn from the pressure generator water jacket by the water pump through a conduit 175 by the water pump and is forced by the water pump through a conduit 178 into an auxiliary water tank 179. A conduit 180 leads from the auxiliary water tank 179 to the fitting 31 on the end of vaporizing coil 28 which extends through the burner head 20 to supply water to the vaporizing coil 28.

Conduits 181 and 182 interconnect the auxiliary fuel and water tanks 155 and 179 at the upper ends of these tanks, and a conduit 183 connects the conduits 181 and 182 to the compressed air supply tank 132 to maintain the same air pressure on the fuel and water in the tanks 155 and 179.

An electric generator 185 is mounted on the crankcase 45 and driven by a belt 186 trained over belt pulleys 187 and 188 mounted on the engine crankshaft 52 and the generator shaft 189 to supply electrical energy for the fuel-igniting means and the electrical valve controls 34 and 35.

With the above-described arrangement, fuel is forced through the vaporizing coil 29 and the nozzle 21 and combustion air is forced through the nozzle 21. The fuel is vaporized in the vaporizing coil and mixed with the combustion air, and the air and fuel mixture is ignited by the electrode 37 at the nozzle end of the burner 21 and burns in the combustion chamber 190 in the receptacle 10. At the same time, water is forced through the vaporizing coil 28 and converted into steam, which is forced into the combustion chamber of the receptacle through the nozzle 22, and compressed air is forced through the nozzle 22 and mixed with the steam or water vapor, the mixture of air and steam being forced into the combustion chamber 190 within the receptacle 10. The steam hydrolyzes some of the products of fuel combustion in the combustion chamber to produce a new fuel the same as or similar to commercial water gas, which burns at a temperature higher than the combustion temperature of ordinary liquid fuel, such as diesel oil.

When the valve 42 is open, the products of combustion will be forced from the combustion chamber 190 through the conduit 40, and, as long as the pressure of the compressed air in the air supply tank 132 is above the pressure in the conduit 40, combustion will be sustained in the pressure generator receptacle 10.

Since the fluid flowing through the conduit 40 is at high pressure and high temperature, it may be used to operate a power plan similar to a steam engine or turbine, wherein the heat content as well as the pressure of the operating fluid is utilized to produce power. The construction and operation of the two burner controls 34 and 35 may be substantially identical and the operation of one such control is diagrammatically illustrated in Figure 9, while the construction of this control is illustrated in Figure 6, the control 34 having been selected for detailed illustration and description.

The control itself comprises, in addition to the housing 27 to which the outer end of the burner 22 is attached, a motor including a rotatable armature 191 mounted on a shaft 192 journaled at its ends on the side walls of the housing 27, the armature carrying electromagnetic coils 193 and 194. Field magnets 195 and 196 are mounted in the housing 27 in partially surrounding relationship to the armature 191 and coaxially of the shaft 192. The field magnets 195 and 196 are provided with electromagnetic coils 197 and 198, respectively, and the alternative energization of these coils will move the armature 191 to one of the other of two operative positions.

A small gear 200 is mounted on the shaft 192, and the valve stem 25 is provided at its end projecting into the housing 27 with a rack bar 201, the teeth of which mesh with the teeth of the gear 200.

When the coil 197 of the magnet 195 is energized, the armature 191 is moved to a postion, as illustrated in Figure 6, in which the valve stem 25 seats in the valve seat at the nozzle end 24 of the nozzle 22 and closes the nozzle. When the coil 197 is deenergized and the coil 198 of the magnet 196 is energized, the armature 191 is rotated to an operative position in which it withdraws the pointed end of the valve stem 25 from the valve seat at the nozzle end of the tube 23 of the nozzle 22 and opens the nozzle, so that the air and vapor mixture can flow out of the nozzle end of the nozzle tube.

As illustrated in Figure 9, a manually operated control switch 205 is provided and has two operative positions, one designated as "off," and the other as "on." The center contact 206 of the switch 205 is connected through a conductor 207 with one side of a battery 208 which is charged by the generator 185. A commutator 209 having electrically interconnected contacts 210 and 211 spaced apart approximately 180° is mounted on the shaft 192, and four brushes 212, 213, 214 and 215 are arranged for engagement by the contacts 210 and 211 of the commutator. The brushes 212 and 213 are spaced apart approximately 180° and constitute one pair of brushes, while the brushes 214 and 215 are spaced approximately 180° from each other and constitute a second pair of brushes. The brush 214 is spaced approximately 135° from the brush 213, and the magnet 196 is spaced approximately 135° from the magnet 195, so that the pair of brushes engaged by the contacts of the commutator is dependent upon the operative positions of the armature 191 relative to the electromagnets 195 and 196.

A conductor 216 connects the "off" contact 217 of the switch 205 with the brush 214, and a conductor 218 connects the brush 215 opposite the brush 214 with one side of the magnet coil 197, the other side of this coil being connected to the battery by a conductor 219. A conductor 220 connects one side of the armature coil 194 to the conductor 218, and a conductor 221 connects the other side of the armature coil 194 to the return line 219 to the battery through a conductor 222. The "on" contact 223 of the switch 205 is connected by a conductor 224 to the brush 212, and the brush 213 opposite the brush 212 is connected through conductors 225 and 226 to the coil 198 of the magnet 196 and to the coil 193 of the armature 191 at one side of each of these coils. The other sides of the coils 198 and 193 are connected to the return line 219 to the battery by the conductors 222 and 227.

With this arrangement, a circuit is set up so that when the switch is moved from the "off" contact 217 to the "on" contact 223, a circuit will be established from one side of the battery 208 through the conductor 207, the switch 205, the conductor 224, the brushes 212 and 213, and the commutator 209 and the conductors 225 and 226 to the electromagnetic coils 198 and 193, and thence from these coils through the conductors 227 and 222 to the other side of the battery. Energization of the coils 198 and 193 will cause the armature 191 to move toward the field magnet 196, and this will move the commutator 209 away from the brushes 212 and 213 breaking the circuit to the coils 198 and 193 and into engagement with the brushes 214 and 215 to set up an energizing circuit when the switch is returned to the "off" contact 217.

With this arrangement, the electromagnetic coils are energized only during the brief interval in which the armature 191 is moving from one operative position to the other and do not carry current continuously. This avoids wasting the battery current and overheating the coils, as well as providing for the prompt reversal of the movement of the armature when desired.

A thermostatic expansion ring 230 is mounted on the inner side of the burner head 20 surrounding the ends of the vaporizing coils extending through the burner head, and is supported at one side in a partly circular bracket 231. An insulated contact 232 extends through the cylindrical wall of the receptacle 10 and terminates adjacent the outer side of the ring 230 at the unsupported side of the latter.

The ring is connected by a conductor 233 to the conductor 207 leading from the battery to the center contact or arm of the switch 205, and a conductor 234 connects the insulated contact 232 to the conductor 216 which leads from the "off" contact of the switch 205 to the brush 212.

If the temperature in the combustion chamber 190 of the receptacle 10 reaches a predetermined value considered to be dangerous, the ring 230 will expand until it contacts the contact or electrode 232, and, if the switch 205 is then in its "on" position and the nozzles are open, the coil 197 of the "off" magnet 195 and the corresponding coil 194 of the armature 191 will be energized and the armature 191 will move to close the nozzle.

It is contemplated that both of the controls 34 and 35 may be connected together to operate simultaneously, or that a complete control circuit may be provided for each burner control with a separate switch for controlling each burner. In this case, it will be necessary to connect the expansion ring 230 into only the nozzle control for the nozzle carrying the liquid fuel as the steam-carrying burner would not overheat the pressure generator.

A transparent window 235 is mounted in an opening in the cylindrical wall of the receptacle 10, so that the flame from the nozzles 21 and 22 can be visually observed and adjustments made if any abnormal conditions are apparent. Suitable means for adjusting the relative quantities of air and vapor in each nozzle may be provided in a manner well known to the art.

The apparatus herein described will generate large quantities of gas in proportion to the weight and size of the apparatus at high pressures and temperatures, and the major portion of such generated gas or pressure fluid is available for operating a suitable prime mover, only a small fraction being required for the operation of the compressor and pump-driving engine.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A device for generating thermodynamic fluid comprising a substantially hollow cylindrical combustion chamber having opposed closed and open ends, a removable closure member for said open end, a pair of spaced injection nozzles disposed within said combustion chamber and supported by said closure member, each of said nozzles having a valve therein for opening and closing the discharge end of the nozzle, said nozzles each having an inlet end disposed externally of said combustion chamber and adjacent the outer side of said closure, a pair of vaporizing coils disposed within said combustion chamber and each of said coils having an end thereof connected with one of said nozzles respectively, the other ends of said coils passing through said closure member so as to be carried thereby, means connecting said other end of one of said coils with a source of liquid fuel under pressure to provide fuel to be vaporized in said one coil, means connecting said other end of the other of said coils with a source of water to provide water to be vaporized in said other coil, means connecting said inlet end of said nozzles with a source of air under pressure to provide air for mixing with the vaporized fuel and water in respective nozzles, means for igniting the mixture of vaporized liquid fuel and air at the orifice of said first nozzle, a thermally responsive means positioned in said chamber, said coils, nozzles, thermally responsive means and means for igniting the fuel and air mixture all being supported on said closure member for insertion and removal from said combustion chamber as a unit, outlet means connected with said combustion chamber to discharge the combustion products, a motor operatively connected to each of the valves of said nozzles, a switch in circuit with said thermally responsive means in each of said motors, said motors being actuable in response to the temperature in said chamber sensed by said thermally responsive means to effect closing movement of the valves when the temperature in said chamber attains a predetermined value and to effect opening movement of the valves when the temperature in said chamber falls below said predetermined value.

References Cited in the file of this patent

UNITED STATES PATENTS

| | | | |
|---|---|---|---|
| 569,287 | Karavodin | Oct. 13, | 1896 |
| 1,047,647 | Johnson | Dec. 17, | 1912 |
| 1,372,121 | Davis | Mar. 22, | 1921 |
| 1,562,333 | Johnson | Nov. 17, | 1925 |
| 1,777,097 | Lasley | Sept. 30, | 1930 |
| 1,806,133 | Thomas | May 19, | 1931 |
| 1,840,690 | Bissell | Jan. 12, | 1932 |
| 2,140,085 | Maina | Dec. 13, | 1938 |
| 2,541,900 | Williams | Feb. 13, | 1951 |
| 2,595,765 | Clarke | May 6, | 1952 |

FOREIGN PATENTS

| | | | |
|---|---|---|---|
| 271,899 | Great Britain | Aug. 18, | 1927 |